United States Patent Office 3,161,698
Patented Dec. 15, 1964

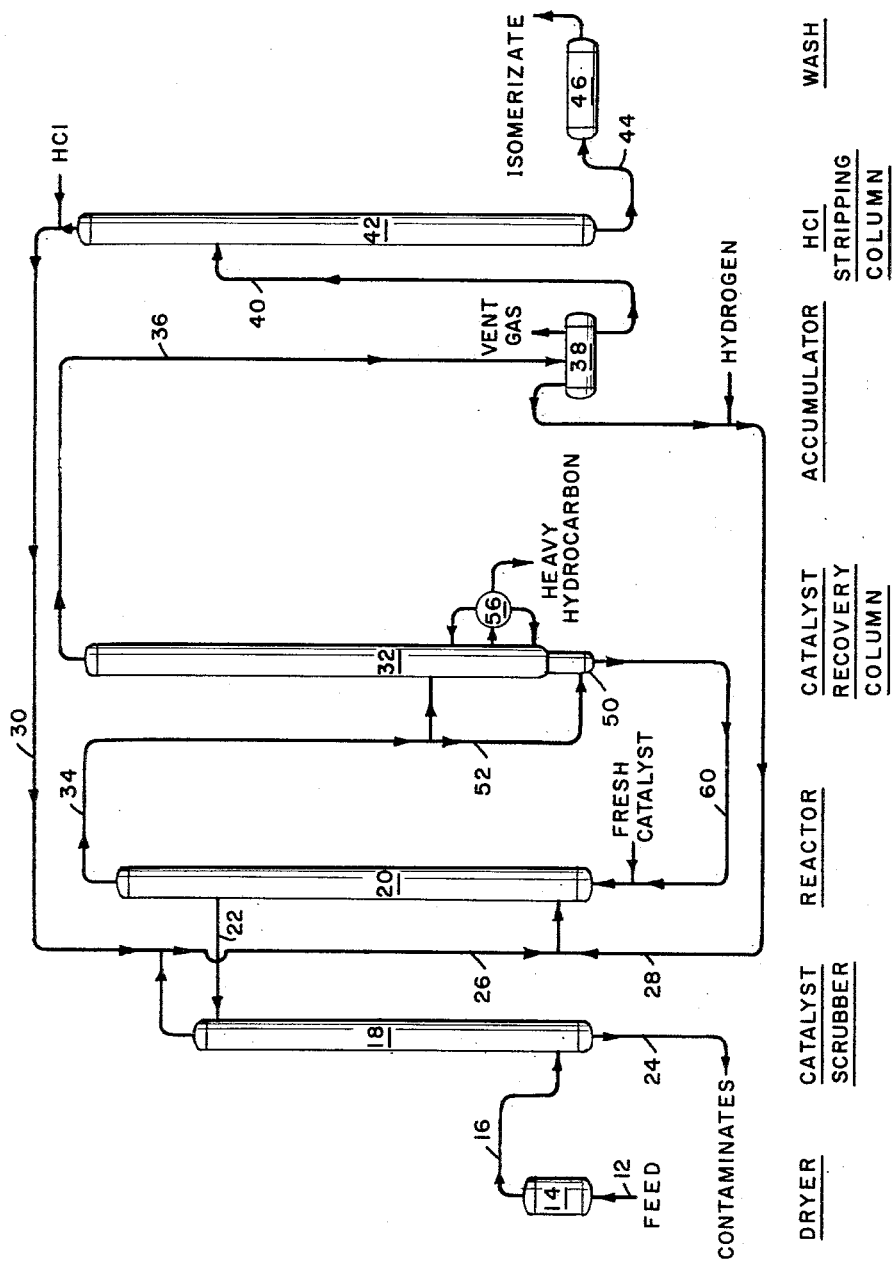

3,161,698
CONVERSION PROCESS
Eugene B. Fountain, Berkeley, Calif., assignor to Shell Oil Company, New York, N.Y., a corporation of Delaware
Filed Dec. 13, 1962, Ser. No. 244,413
3 Claims. (Cl. 260—683.74)

This invention relates to an improved process for effecting catalytic conversion of hydrocarbons in liquid phase with fluid catalyst. More particularly, this invention relates to the isomerization of saturated hydrocarbons in liquid phase with a catalyst of the molten salt type, especially such as molten salt mixtures comprising metal salts of the Friedel-Crafts type.

The liquid phase isomerization of normal paraffins such as butane is well known and has been in commercial use for many years. The process is described for example in the "Oil and Gas Journal" No. 14, page 151, April 3, 1961. In the past, commercial isomerization has generally been limited to butane and, to a lesser extent, pentane since the need heretofore, especially during times of war, has been mainly for the production of aviation gasoline. More recently, however, the demand for high octane motor gasoline has created a need for high-octane, low-boiling components such as isopentane and isohexane. Thus, recent emphasis has been on the development of a practical process for isomerizing normal pentane and higher molecular weight normal paraffins for motor gasoline blending.

When isomerizing these higher molecular weight paraffins, which are generally only available in hydrocarbon fractions which also contain naphthenes such as methylcyclopentane, a heavy hydrocarbon fraction containing $C_8$ and $C_{12}$ hydrocarbon is produced which cannot be completely separated from the catalyst phase by fractionation in a distillation column (generally referred to as a catalyst recovery column). As a consequence, the heavy hydrocarbons are dissolved and entrained in the catalyst phase which is withdrawn from the bottom of the catalyst recovery column and recycled to the isomerization reactor. The heavy hydrocarbon deactivates aluminum halide catalyst by forming a complex with the aluminum halide.

Moreover, the addition of fresh aluminum halide is generally effected by dissolving the aluminum halide in part of the recycle catalyst, which is primarily antimony trihalide. When fresh catalyst is added in this manner, substantial quantities of aluminum halide are deactivated, before the catalyst reaches the isomerization reactor, as a result of complexing aluminum halide with heavy hydrocarbon dissolved in the recycle catalyst.

It has now been found in accordance with the present invention that heavy hydrocarbon can be removed from recycle catalyst by extracting the recycle catalyst with light hydrocarbons such as reactor effluent. In a preferred embodiment of the invention, an extraction zone is provided at the bottom of the catalyst recovery column wherein the recycle catalyst is extracted with a portion of reactor effluent containing isomerizate. In this manner, recycle catalyst is cooled while reactor effluent to the catalyst recovery column is heated and the heavy hydrocarbon is extracted from the recycle catalyst. These and further advantages of the invention will be apparent to those skilled in the art from the following detailed description made with reference to the drawing which is a flow diagram illustrating a preferred embodiment of the process of the invention.

The invention is applicable to the isomerization of $C_5$ and heavier normal paraffins, preferably a $C_5$ to $C_7$ saturate fraction containing normal paraffins and naphthenes. In order to set forth more fully the nature of the invention, without however intending to limit the scope thereof, it will be described in detail as applied to liquid phase isomerization of a $C_5/C_6$ straight-run fraction with an aluminum chloride-antimony trichloride molten salt catalyst.

Referring now to the drawing, the straight-run feed containing normal paraffins and naphthenes is introduced through line 12 and dried in dryer 14. With feeds which are substantially free from water, dryer 14 will of course be unnecessary and can be by-passed. Auxiliary equipment such as pumps, compressors, heat exchangers, control mechanisms, valves, etc., which are obvious to those skilled in the art are not shown. Dry feed passes through line 16 into the bottom of catalyst scrubber 18 and rises through the scrubber countercurrently to catalyst pumped from reactor 20 through line 22. The catalyst contains sludge, an aluminum chloride-hydrocarbon complex formed as a result of undesirable side reactions in the reactor. In scrubber 18, antimony trichloride and active aluminum chloride in the catalyst are dissolved in the feed. The sludge, which is insoluble in hydrocarbon, and other contaminants such as corrosion products are removed from the scrubbing zone through line 24. The feed, now containing dissolved catalyst components, is passed through reactor 20 via line 26 together with hydrogen from line 28 and hydrogen chloride from line 30. The reactor can be suitably of the stirred type which has been used in commercial practice but is preferably a vertical tower containing a pool of catalyst such as described in Thomas, U.S. Patent 2,983,775, issued May 9, 1961. The catalyst is a molten salt mixture of antimony trichloride and aluminum chloride in appropriate proportions of from about 84 to about 98% by weight antimony trichloride and from about 16 to about 2% by weight aluminum chloride.

Temperature in the reaction zone can range from a minimum temperature at which the catalyst can be maintained in the molten state up to approximately 210° F. The isomerization can be carried out at higher temperatures but the low temperatures result in a more desirable yield structure. The pressure in the reaction zone conventionally varies from the pressure required to maintain the $C_5/C_6$ fraction primarily in the liquid phase up to any desired super-atmospheric pressure. Pressures from about 120 to about 500 pounds per square inch gauge generally are suitable.

The reactor effluent containing dissolved and entrained catalyst and $C_5/C_6$ product hydrocarbon, generally referred to as isomerizate, enters catalyst recovery column 32 through line 34. The catalyst recovery column is suitably a conventional fractional distillation column. Vapor pressure of the antimony trichloride and aluminum chloride is quite low; therefore, separation from the isomerizate is easily effected. The isomerizate is passed overhead as a vapor through line 36, cooled to condense hydrocarbons therein, and collected in accumulator 38.

Hydrogen is withdrawn from accumulator 38, compressed and recycled through line 28 to reactor 20 as mentioned above. Makeup hydrogen can be added to the system as necessary. Alternatively, it is possible to operate without compression facilities by using once-through hydrogen from a suitable source, such as catalytic reformer or dehydrogenation unit.

Liquid from accumulator 38 is passed via line 40 to hydrogen chloride stripping column 42. Hydrogen chloride is recovered overhead and recycled through line 30 to reactor 20. Hydrogen chloride can be added to this system as necessary. Liquid isomerizate is removed as a bottom product through line 44. It is desirable to give the isomerizate a caustic treatment and water wash in vessel 46 to remove residual hydrogen chloride or traces of catalyst.

Dissolved and entrained catalyst in the reactor effluent is recovered as catalyst recovery column bottoms and is introduced into extraction zone 50 wherein the catalyst is contacted with light hydrocarbon. Boiling point of the light hydrocarbon should be about the same as or slightly below that of the feed hydrocarbons. This is to facilitate removal of the light hydrocarbon overhead from the catalyst recovery column. The hydrocarbon can suitably be, for example, isomerizate from HCl stripping column 42 or, isomerizate from accumulator 38 or, in a preferred embodiment of the invention, the hydrocarbon can be reactor effluent containing isomerizate which is introduced into the extraction zone 50 via line 52. It is preferred to use reactor effluent in order to realize benefits from heat exchange with the hot catalyst system. In this manner, it is possible to cool recycle catalyst to more nearly the temperature of the isomerization reactor. The recovered catalyst also extracts a substantial portion of catalyst components from the reactor effluent. While it is possible to use all of the reactor effluent to extract the heavy hydrocarbon from the catalyst, it is preferred to introduce only a portion of the effluent, for example from about 2 to about 20% by volume of total effluent basis hydrocarbon, into the extraction zone.

The extraction zone can be an external, separate vessel or, in a preferred embodiment of the invention, the zone can be an integral part of the bottom of catalyst recovery column 32, as shown in the drawing. While it is not necessary in the practice of the invention, it is preferred to employ countercurrent extraction techniques in order to realize the maximum benefits of the invention. The extraction can be carried out with or without contact means such as packing, trays and the like.

Isomerizate containing heavy hydrocarbon removed from the recycle catalyst passes into column 32 wherein separation of isomerizate from the heavy hydrocarbon is effected. The heavy hydrocarbon forms a separate liquid phase above the liquid catalyst phase in the reboil section of the catalyst recovery column. The heavy hydrocarbon is withdrawn for example either as a separate liquid phase from the catalyst recovery column or as a separate liquid phase from reboiler 56 via line 58. The heavy hydrocarbon is preferably treated to remove dissolved catalyst components. Recovered catalyst substantially free from heavy hydrocarbon is recycled to isomerization reactor 20 through line 60. The recycle catalyst or a portion thereof can suitably be employed to add fresh aluminum halide to the isomerization system in the manner described previously.

The following examples are illustrative of some of the advantages derived from the invention. These are not to be considered to limit the scope of the invention.

EXAMPLE I

In order to demonstrate that heavy hydrocarbon, probably formed as a result of coupling of naphthenes such as methylcyclopentane, is responsible for deactivation of aluminum halide catalysts, three samples were prepared as follows:

(1) Fresh antimony trichloride plus 2.5% by weight aluminum chloride as a control sample.

(2) Fresh antimony trichloride, sufficient $C_6$ paraffinic isomerization feed to saturate the antimony trichloride, and 2.5% by weight aluminum chloride.

(3) Fresh antimony trichloride, sufficient heavy hydrocarbon from a catalyst recovery column (obtained during the isomerization of a hexane feed containing naphthenes with an aluminum chloride-antimony trichloride catalyst) to saturate the antimony trichloride, and 2.5% by weight aluminum chloride.

These samples were maintained at 176° F. for 30 hours. The results of these tests are given in Table I below.

Table I

| | Sample 1 (control) | Sample 2 (feed) | Sample 3 (heavy hydrocarbon) |
|---|---|---|---|
| Percent weight complex aluminum chloride | 0.00 | 0.03 | 0.40 |

It is evident that heavy hydrocarbon and not isomerization feed is responsible for most of the complexing and deactivation of aluminum chloride catalyst.

EXAMPLE II

The deleterious effect of heavy hydrocarbon such as $C_8$ and $C_{12}$ hydrocarbon in recycle catalyst is demonstrated by the following test. A $C_6$ saturate feed containing normal paraffins and naphthenes was isomerized at 170° F. and 300 p.s.i.g. using an aluminum chloride-antimony trichloride catalyst composed of 3–7% weight aluminum chloride and 93–97% weight antimony trichloride. No catalyst was recycled from the catalyst recovery column to the reactor during this period. Catalyst losses were balanced by the addition of aluminum chloride dissolved in fresh antimony chloride at the rate of 4 grams aluminum chloride per 1000 grams of feed. After 55 hours on-stream operation, conversion of normal hexane to dibranched hexane isomers was about 30% (about 55% of equilibrium). Analysis of the catalyst at this time indicated 5.4% weight aluminum chloride and 1.2% weight complexed aluminum chloride.

After 70 hours of on-stream operation, makeup aluminum chloride was then added to the system by dissolving 2.5% by weight aluminum chloride in recycle catalyst from the catalyst recovery column. After 100 hours of on-stream operation, the conversion to dibranched hexane isomers was only about 25% (45% of equilibrium) which indicated a loss in catalyst activity. The catalyst contained 4% by weight free aluminum chloride and 3.4% by weight complexed aluminum chloride. Analysis of the makeup stream entering the reactor showed 1.0% by weight complexed aluminum chloride with this manner of operation. Aluminum chloride was complexed in the makeup system at a rate of 1.5 grams per 1000 grams feed and was complexed in the reactor at a rate of only about 0.4 gram per 1000 grams feed. Thus, when recycle catalyst is used to add makeup aluminum chloride to the reactor, a large proportion of the heavy hydrocarbon is complexed with aluminum chloride before entering the reactor.

EXAMPLE III

Some of the advantages of the present invention are illustrated in the following test which was conducted at operating conditions comparable to those used in Example II. During the first 20 hours, makeup aluminum chloride was dissolved in fresh antimony trichloride and no catalyst was recycled from the catalyst recovery column to the reactor. Thereafter, makeup aluminum chloride was dissolved in recycle catalyst which had been extracted with isomerizate. After 62 hours of on-stream operation, the conversion to dibranched hexane isomers was about 30% (about 55% of equilibrium) which is approximately the same as the conversion obtained when adding fresh aluminum chloride dissolved in fresh antimony trichloride. As there is no loss in catalyst activity, reflected by the conversion level, it is evident that extracting recycle catalyst with isomerizate removes substantially all of the heavy hydrocarbons dissolved in the recycle catalyst and thereby prevents complexing of fresh aluminum chloride with the heavy hydrocarbons.

I claim as my invention:

1. In an isomerization process wherein a $C_5$ to $C_7$ saturate fraction containing normal paraffins and naphthenes is contacted in a reaction zone with molten salt catalyst comprising aluminum halide and antimony trihalide and, reaction zone effluent is separated in a fractionation zone into a vaporous phase containing isomerization product and a liquid catalyst phase containing heavy hydrocarbon, the improvement which comprises contacting the liquid catalyst phase in an extraction zone with at least a portion of the reactor effluent, withdrawing from the extraction zone catalyst substantially reduced in concentration of heavy hydrocarbon and using the catalyst for the isomerization of further quantities of normal paraffin.

2. In an isomerization process wherein a $C_5$ to $C_7$ saturate fraction containing normal paraffins and naphthenes is contacted in a reaction zone with a molten salt catalyst comprising aluminum chloride and antimony trichloride and reaction zone effluent is separated in a fractionation zone into a vaporous phase containing isomerization product and a liquid catalyst phase containing heavy hydrocarbon, the improvement which comprises contacting the liquid catalyst phase in an extraction zone with at least a portion of the reactor effluent, withdrawing from the extraction zone catalyst substantially reduced in concentration of heavy hydrocarbon, dissolving fresh aluminum chloride in at least a portion of the catalyst and using the catalyst containing aluminum chloride for the isomerization of further quantities of normal paraffins.

3. In an isomerization process which comprises
    contacting a $C_5$ to $C_7$ hydrocarbon feed containing normal paraffins and naphthenes with a molten salt catalyst comprising aluminum chloride and antimony chloride in a reaction zone,
    removing a portion of sludge-containing catalyst from the reaction zone and contacting said catalyst with feed hydrocarbons, thereby dissolving soluble catalyst components from the catalyst sludge,
    removing reaction zone effluent comprising isomerized hydrocarbons, dissolved catalyst consisting primarily of antimony trichloride, and dissolved heavy hydrocarbon,
    separating reaction zone effluent in a fractionation zone into a vaporous phase containing isomerization product and a liquid phase comprising antimony trichloride and dissolved heavy hydrocarbon,
    removing a stream of said liquid phase from the fractionation zone, dissolving fresh make-up aluminum chloride therein, and returning said stream to the reaction zone,
    the improvement which comprises contacting the liquid phase from the fractionation zone prior to addition of fresh aluminum chloride with at least a portion of the reaction zone effluent in an extraction zone, removing from the extraction zone a liquid catalyst phase comprising antimony chloride substantially reduced in heavy hydrocarbon content and a reaction zone effluent phase enriched in heavy hydrocarbon, and passing the reaction zone effluent phase to the fractionation zone.

References Cited in the file of this patent
UNITED STATES PATENTS

| | | |
|---|---|---|
| 2,394,810 | Ross | Feb. 12, 1946 |
| 2,420,086 | McAllister et al. | May 6, 1947 |
| 2,927,139 | Findlay | Mar. 1, 1960 |
| 2,983,775 | Thomas | May 9, 1961 |